March 10, 1931.  C. I. SHAWVER  1,796,054
WOODWORKING MACHINE
Filed July 15, 1929
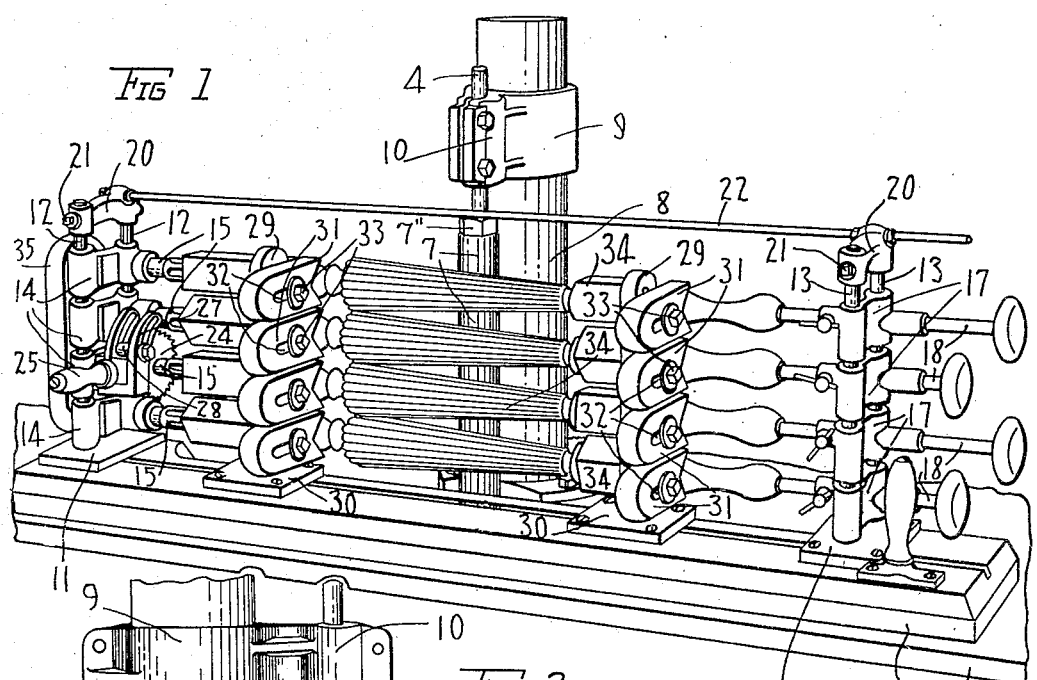
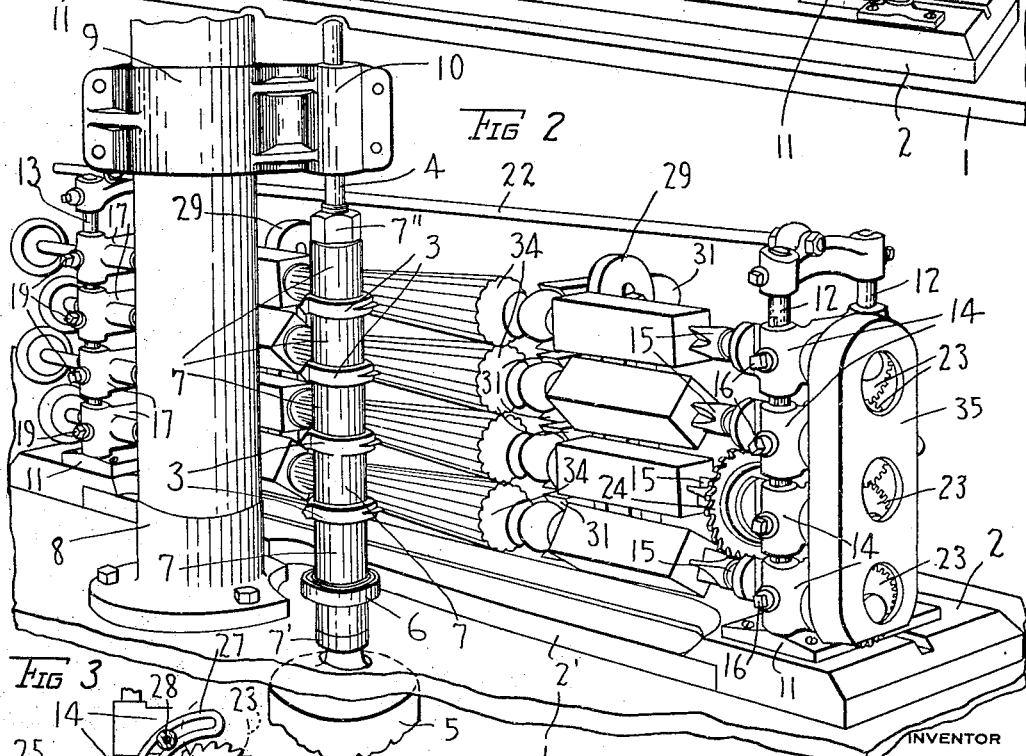
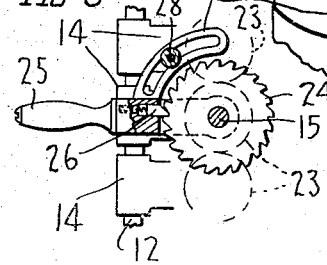
INVENTOR
Charles I. Shawver
BY Staley & Welch
ATTORNEYS Patented Mar. 10, 1931

1,796,054

UNITED STATES PATENT OFFICE

CHARLES I. SHAWVER, OF SPRINGFIELD, OHIO

WOODWORKING MACHINE

Application filed July 15, 1929. Serial No. 378,402.

This invention relates to wood working machines, it more particularly relating to a machine for fluting or reeding such articles as table legs, balusters and the like in which the articles are held in work holders mounted upon a suitable base which is manually moved with relation to a rotary cutter.

The object of my invention is to provide a machine of this kind in which provision is made for readily installing additional work holders to increase the capacity of the machine.

In the accompanying drawings:

Fig. 1 is a perspective view looking at the forward side of the machine.

Fig. 2 is a perspective view looking at the rear of the machine.

Fig. 3 is a detail of the spacer.

Referring to the drawings, 1 represents a suitable table which supports the mechanism. The work holders are mounted upon a base 2 equipped with a suitable pattern 2', the base being adapted to be manually moved over the surface of the table to bring the articles to be fluted in cooperative relation with the cutters. The cutters are shown at 3 and revolve with the shaft 4 which is an extension of or connected with the shaft of an electric motor 5 suitably supported by the table, with the shaft 4 extending vertically above the table. There is also mounted on ball bearings on the shaft an anti-friction ring 6 for the pattern 2' and this ring and the cutters are held in spaced relation by spacing sleeves 7, the cutters being secured to rotate with the shaft by a nut 7'' threaded thereon which cooperates with a fixed collar 7' to clamp the sleeves, cutters and inner race ring of the ball bearings together. A suitable support 8 secured to and projecting upwardly from the table is provided to which is clamped a collar 9 which has a bearing 10 for the upper end of the shaft 4.

Each end of the base 2 has secured thereto a metallic plate 11 into each of which is screwed a pair of rod like standards 12 and 13, aligned transversely in spaced-apart relation. The standards 12 support bearing heads 14 for the spindles 15 of head stocks, each bearing head 14 having a pair of sleeved portions which receive the standards 12 and being provided with set screws 16 by which they can be locked to position on the standards. The standards 13 support heads 17 which have threaded bores to receive the threaded tail stock members 18, these heads 17 also being provided with set-screws 19 by which they are locked to position. The upper ends of the standards receive removable heads 20 secured thereto by set-screws 21 connected by a rod 22 by which the standards are braced.

Each spindle 15 has a spur gear 23, which gears are meshed together whereby the spindles may be simultaneously rotated to space the work. This spacing is done by providing one of the spindles with the ratchet wheel 24 and a pivoted lever 25 carrying a spring-pressed pawl 26, as shown in Fig. 3. The lever is embraced by a pair of curved slotted arms 27 fastened to one of the heads 14, which arms carry an adjustable stop pin 28 for regulating the stroke of the lever to space the work the required distance.

Standards 29 projecting upwardly from plates 30 secured to the base 2 each carries a series of steady rests 31. Each of these rests is slotted as shown at 32 to receive a bolt 33 by which it may be adjustably connected to its standard and the inner end of each rest is forked or grooved to receive the table leg or other article, indicated at 34, to steady the same against the action of the cutting tools and reduce chatter.

These machines are shipped with any number of work holders desired but the machines are equipped with standards 12 and 13 of a height to receive a desired maximum number of work holders so that a purchaser of a machine with two sets of work holding devices may readily equip the machine with additional work holding devices by simply removing the heads 20, slipping additional heads 14 and 17 onto the standard, and securing them in such position that their gears 23 will be properly meshed. The standards 29 are likewise formed of such height that additional steady rests may be secured thereto.

The gears are preferably enclosed by a cover 35 which is of a size sufficient to accommodate the maximum number of gears.

Having thus described my invention, I claim:

1. In a machine of the character described, a movable base, a vertical support at each end of said base, work holding devices, and means for independently attaching to said supports the heads of a plurality of such work holding devices, one above the other by inserting the devices onto the upper ends of said supports and axially adjusting the same to position, together with means for holding the same in position.

2. In a machine of the character described, a movable base, a vertical support at each end of said base, work holding devices each having a sleeved head and means for independently attaching to said supports the sleeved heads of a plurality of such work holding devices by slipping said heads upon said supports from the upper end thereof, together with means for attaching the sleeved heads in position upon said supports.

3. In a machine of the character described, a movable base, a pair of spaced vertical supporting rods at each end of said base, a series of work supporting devices each including a head sleeved to loosely fit a pair of rods, and means for securing the heads to said rods by inserting the heads individually onto the upper ends of said rods and moving the same axially thereon to proper position.

4. In a machine of the character described, a movable base, a pair of spaced vertical supporting rods at each end of said base, a series of work supporting devices each including a head sleeved to loosely fit a pair of rods, and means for securing the heads to said rods, a revoluble spindle included in each work supporting device on one pair of rods, and a gear connected with each spindle meshed with the gear of an adjacent spindle.

5. In a machine of the character described, a movable base, a pattern on the base, a rotary shaft, a plurality of cutters on said shaft in spaced-apart relation, a vertical support at each end of said base, and means for independently attaching to said supports the heads of a plurality of work holding devices, one above the other by inserting the devices individually onto the said supports and moving the same axially thereon to proper position, together with means for securing the same in position.

6. In a machine of the character described, a vertically disposed rotary shaft, a plurality of spaced-apart cutters on said shaft, an anti-friction ring freely rotatable on said shaft, a movable base, a pattern on the base cooperating with said anti-friction ring, a vertical support at each end of said base, and means for independently attaching to said supports the heads of a plurality of work holding devices, one above the other.

7. In a machine of the character described, a movable base, a vertical support at each end of said base, a plurality of work holding devices each having a head, means for independently attaching to said supports the heads of a plurality of such work holding devices by inserting the devices individually onto the said supports from one end of each support and moving the same axially on said supports to proper position, together with means for securing the same in position, a pair of vertical standards connected with said base, and means for independently attaching to said standards a plurality of steady rests.

In testimony whereof, I have hereunto set my hand this 10th day of July, 1929.

CHARLES I. SHAWVER.